United States Patent
Johnson et al.

(10) Patent No.: US 8,662,447 B2
(45) Date of Patent: Mar. 4, 2014

(54) FLEXIBLE-USAGE TRAVEL SUITE

(75) Inventors: Glenn A. Johnson, Rural Hall, NC (US); Tommy G. Plant, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 313 days.

(21) Appl. No.: 13/163,089

(22) Filed: Jun. 17, 2011

(65) Prior Publication Data

US 2012/0318918 A1 Dec. 20, 2012

(51) Int. Cl.
*B64D 11/00* (2006.01)
(52) U.S. Cl.
USPC .................................... 244/118.6; 244/118.5
(58) Field of Classification Search
USPC ............................................ 244/118.5, 118.6
See application file for complete search history.

(56) References Cited

U.S. PATENT DOCUMENTS

| | | | | |
|---|---|---|---|---|
| 6,059,364 | A * | 5/2000 | Dryburgh et al. | 297/354.13 |
| 6,220,660 | B1 * | 4/2001 | Bedro et al. | 297/188.04 |
| 7,578,471 | B2 * | 8/2009 | Beroth | 244/118.6 |
| 7,721,991 | B2 * | 5/2010 | Johnson | 244/118.6 |
| 7,997,531 | B2 * | 8/2011 | Bettell | 244/118.6 |
| 8,096,502 | B2 * | 1/2012 | Bock et al. | 244/118.6 |
| 8,177,165 | B2 * | 5/2012 | Bettell | 244/118.6 |
| 8,313,060 | B2 * | 11/2012 | Darbyshire | 244/118.6 |
| 2005/0103935 | A1 * | 5/2005 | Sprenger et al. | 244/118.6 |
| 2006/0077255 | A1 * | 4/2006 | Cheng | 348/143 |
| 2008/0088160 | A1 * | 4/2008 | Johnson | 297/240 |
| 2008/0203227 | A1 * | 8/2008 | Beroth | 244/118.6 |
| 2009/0146005 | A1 * | 6/2009 | Bettell | 244/118.6 |
| 2009/0302158 | A1 * | 12/2009 | Darbyshire et al. | 244/118.6 |
| 2010/0065683 | A1 * | 3/2010 | Darbyshire | 244/118.6 |
| 2010/0301162 | A1 * | 12/2010 | Hankinson | 244/118.6 |
| 2011/0210204 | A1 * | 9/2011 | Collins et al. | 244/118.6 |
| 2011/0253838 | A1 * | 10/2011 | Bettell | 244/118.6 |

* cited by examiner

*Primary Examiner* — Tien Dinh
*Assistant Examiner* — Justin Benedik
(74) *Attorney, Agent, or Firm* — Shumaker, Loop & Kendrick, LLP

(57) ABSTRACT

A flexible-usage travel suite that includes an enclosure having a floor, surrounding walls defining a predetermined area and an egress/ingress opening. A seat is positioned adjacent a first side of the enclosure and is moveable between a deployed seating configuration and a stowed storage configuration against the first side of the enclosure. A bed is positioned adjacent a second side of the enclosure and is moveable between a deployed lie-flat configuration when the seat is in its stowed storage configuration, and a stowed storage position when the seat is in its deployed seating configuration. A utility chair and utility table are positioned within the enclosure and are moveable among a stowed position and a use position.

20 Claims, 11 Drawing Sheets

US 8,662,447 B2

FLEXIBLE-USAGE TRAVEL SUITE

TECHNICAL FIELD AND BACKGROUND OF THE INVENTION

This invention relates to a flexible-usage travel suite that has application in a wide range of environments. The invention is not limited to any particular mode of usage, but usage within aircraft, vessels, and land vehicles is the environment within which the invention is described. The invention is more particularly described by way of illustration as a travel suite appropriate for use in premium class, long haul, international air carriers.

Long haul international air carriers typically provide three classes of service for passengers—coach class, which accommodates the large majority of passengers at a relatively low fare and with minimal amenities; business class, which accommodates a relatively smaller number of higher fare-paying passengers with more amenities; and premium class, which accommodates relatively few passengers at relatively high fares with luxurious amenities, including premium food and beverages, large accommodation seating areas and the like. With the advent of larger long haul aircraft such as the Boeing 747 and Airbus 380, more space is available for accommodating the travel preferences of premium class passengers who can afford to pay higher fares for more space, privacy and a more efficient work area.

Prior art long haul premium accommodations typically include a relatively large seat that moves through a wide range of motion between full upright position for take-off and landing and dining, a partial recline relaxation position, and full recline position in which the seat back, seat bottom and footrest extend into a generally lie-flat, recumbent configuration to form a bed, most often with a head end slightly raised above the foot end. In some instances, an ottoman that does not form a connected part of the seat abuts the seat in the lie flat configuration to extend the length of the bed. These seating units have in common the use of the same elements for different purposes—for example, the use of the same structure for both a seat and a bed, as described above. Designing seating components in this fashion inherently requires design compromises. For example, the requirement for a seat to have a back, bottom and leg rest that move relative to each other inherently requires numerous motors and linkage elements that cause increased weight, expense and complexity, as well as laterally-extending creases between the cushions that cause the bed surface to be not truly flat. In addition, the g-loading requirements for seats require relatively hard foam cushioning that is uncomfortably hard when used as a bedding surface.

SUMMARY OF THE INVENTION

It is therefore an object of the present invention to provide a travel suite that has principal components that are dedicated to a particular use, rather than serving two or more different uses. In this manner, the premium class passenger receives a more premium product for the higher fare. The inventive design elements described and claimed in this application permit a more premium travel experience for the premium fare-paying passenger, while occupying generally the same space as conventional premium seating arrangements in which the seat functions both as a seat and a bed.

These and other objects and advantages of the invention are achieved by providing a flexible-usage travel suite that includes an enclosure having a floor, surrounding walls defining a predetermined area and an egress/ingress opening. A seat is positioned adjacent a first side of the enclosure and is moveable between a deployed seating configuration and a stowed storage configuration against the first side of the enclosure. A bed is positioned adjacent a second side of the enclosure and is moveable between a deployed lie-flat configuration when the seat is in its stowed storage configuration, and a stowed storage position when the seat is in its deployed seating configuration. A utility chair is positioned adjacent a third side of the enclosure opposite the first side of the enclosure and is moveable between a deployed use configuration when the bed is in its stowed storage configuration, and a stowed configuration when the bed is in its deployed lie-flat configuration. A utility table is positioned within the enclosure and is moveable among a stowed position, a first use position forward of the utility chair, and a second use position forward of the seat.

According to one preferred embodiment of the invention, the seat is moveable among a deployed upright seating configuration, a deployed recline seating configuration, and a stowed storage configuration against the first side of the enclosure.

According to another preferred embodiment of the invention, a lengthwise dimension of the bed in both its deployed and stowed configurations is generally perpendicular to a widthwise dimension of the seat in both its deployed and stowed configuration.

According to another preferred embodiment of the invention, the stowed seat forms a headboard for the bed when the bed is in the deployed position.

According to another preferred embodiment of the invention, a proximate portion of the stowed bed forms an armrest for an adjacent side of the deployed seat.

According to another preferred embodiment of the invention, the utility chair is pivotally mounted for rotation between the deployed use configuration and the stowed configuration.

According to another preferred embodiment of the invention, an ottoman positioned on the third side of the enclosure and at least a first portion of the ottoman positioned adjacent the utility chair in their respective stowed storage configurations.

According to another preferred embodiment of the invention, the utility table is mounted for pivotal movement between the stowed stowage position and the first use position forward of the utility chair, and further wherein the utility table is mounted for sliding movement between the first use position forward of the utility chair and the second use position forward of the seat.

According to another preferred embodiment of the invention, an ottoman is positioned on the third side of the enclosure and at least a second portion of the ottoman is mounted for being rotated on a horizontal, laterally-extending axis towards the deployed seat into a use position.

According to another preferred embodiment of the invention, the utility chair includes a side tray mounted on a first side of the chair and moveable between a raised, horizontal use position and a lowered, vertical stowed position alongside a base of the utility chair.

According to another preferred embodiment of the invention, a flexible-usage travel suite is provided, and includes an enclosure having a floor, surrounding walls defining a predetermined area and an egress/ingress opening. A seat is positioned adjacent a first side of the enclosure and is moveable among a deployed upright seating configuration, a deployed recline seating configuration, and a stowed storage configuration against the first side of the enclosure. A bed is positioned adjacent a second side of the enclosure and is moveable between a deployed lie-flat configuration when the seat is in its stowed storage configuration, and a stowed storage position when the seat is in its deployed seating configuration. A lengthwise dimension of the bed in both its deployed and stowed configuration is generally perpendicular to a widthwise dimension of the seat in both its deployed and stowed configuration and the stowed seat forms a headboard for the bed in the bed's deployed position and a portion of the stowed bed forms an armrest for an adjacent side of the deployed seat. A utility chair is positioned adjacent a third side of the enclosure opposite the first side of the enclosure and is moveable between a deployed use configuration when the bed is in its stowed storage configuration, and a stowed configuration when the bed is in its deployed lie-flat configuration. A utility table is positioned within the enclosure and pivotally-mounted among a stowed position, a first use position forward of the utility chair, and a second use position forward of the seat.

According to another preferred embodiment of the invention, an ottoman is positioned on the third side of the enclosure and at least a first portion of the ottoman comprising the utility chair in its stowed storage configuration.

According to another preferred embodiment of the invention, the utility table is mounted for pivotal movement between the stowed storage position and the first use position forward of the utility chair, and further wherein the utility table is mounted for sliding movement between the first use position forward of the utility chair and the second use position forward of the seat.

According to another preferred embodiment of the invention, an ottoman is positioned on the third side of the enclosure and at least a second portion of the ottoman is mounted for being rotated on a horizontal, laterally-extending axis towards the deployed seat into a use position.

According to another preferred embodiment of the invention, the utility chair includes a side tray mounted on a first side of the chair and moveable between a raised, horizontal use position and a lowered, vertical stowed position alongside a base of the utility chair.

According to another preferred embodiment of the invention, an aircraft cabin living area is provided, and includes a plurality of flexible-usage travel suites positioned in the living area in a predetermined array. Each of the travel suites comprises an enclosure having surrounding walls and a floor defining a predetermined area and an egress/ingress opening. A seat is positioned adjacent a first side of the enclosure and is moveable between a deployed seating configuration and a stowed storage configuration against the first side of the enclosure. A bed is positioned adjacent a second side of the enclosure and is moveable between a deployed lie-flat configuration when the seat is in its stowed storage configuration, and a stowed storage position when the seat is in its deployed seating configuration. A utility chair is positioned adjacent a third side of the enclosure opposite the first side of the enclosure and is moveable between a deployed use configuration when the bed is in its stowed storage configuration and a stowed configuration when the bed is in its deployed lie-flat configuration. A utility table is positioned within the enclosure and is moveable among a stowed position, a first use position forward of the utility chair, and a second use position forward of the seat.

According to another preferred aircraft cabin travel suite embodiment of the invention, the seat is moveable among a deployed upright seating configuration, a deployed recline seating configuration, and a stowed storage configuration against the first side of the enclosure.

According to another preferred aircraft cabin travel suite embodiment of the invention, a lengthwise dimension of the bed in both its deployed and stowed configurations is generally perpendicular to a widthwise dimension of the seat in both its deployed and stowed configuration.

According to another preferred aircraft cabin travel suite embodiment of the invention, the environment comprises a long-haul, premium class passenger unit.

According to another preferred aircraft cabin travel suite embodiment of the invention, the environment comprises an aircraft crew rest compartment.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED
EMBODIMENTS AND BEST MODE

Figure 1:
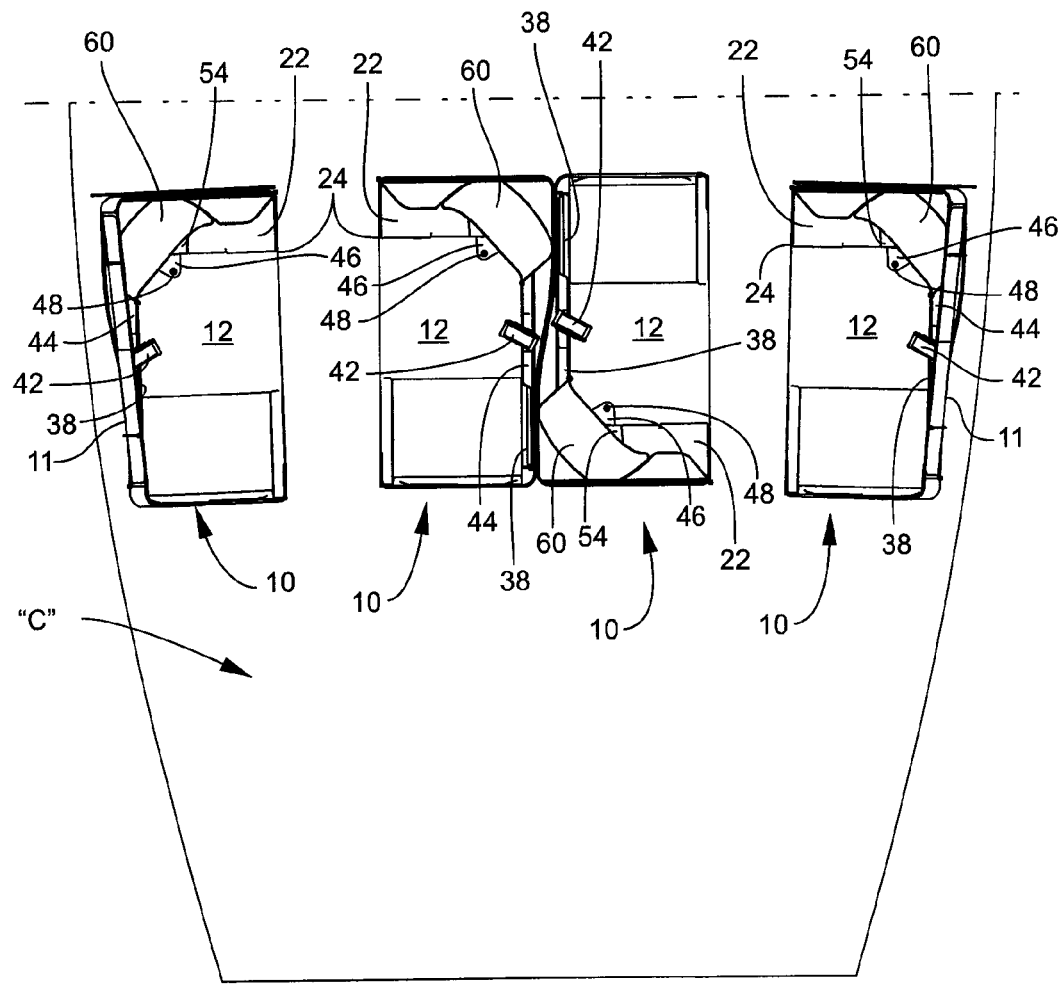
FIG. 1 is a cabin floor plan showing one preferred placement of the travel suites in a premium class aircraft cabin.

Referring now specifically to the drawings, a cabin floor plan showing placement of flexible-usage travel suites 10 in a premium class cabin according to one preferred embodiment of the present invention is illustrated generally in FIG. 1. The travel suites 10 are configured and placed according to the space allocation and weight and balance requirements of the particular aircraft in which the travel suites 10 are installed. The travel suites 10 may be stand-alone units or may be designed to share adjacent walls. In one preferred embodiment shown in FIG. 1, four travel suites 10 are shown arrayed in a side-by-side configuration across the width of a premium class aircraft cabin "C." Other similar arrays may be placed in the cabin "C" depending on the size of the cabin "C" and the proportion of total cabin space dedicated to the premium cabin.

In the embodiment disclosed in this application, each travel suite 10 is defined by an enclosure 11 that includes a floor 12 with suitable track fittings and attachment mechanisms, not shown, for releasably securing the travel suite 10 to the aircraft deck in the required location. Walls 14 delimit the area of the travel suite 10, provide attachment and support structures for the interior components and privacy for the travel suite 10 occupant. The particular travel suite 10 illustrated is intended for a single occupant, but a larger unit with two seats and a correspondingly wider bed is also within the intended scope of the invention. Similarly, the walls 14 of the illustrated travel suite 10 extend upwardly to approximately waist height. In other embodiments, higher walls may be provided to provide greater privacy and noise attenuation.

An egress/ingress opening 16 permits access to the travel suite 10. In other embodiments, particularly those with higher walls, a door, such as an accordion, bifold or pocket door, may be provided to offer further privacy and noise attenuation.

Figure 2:
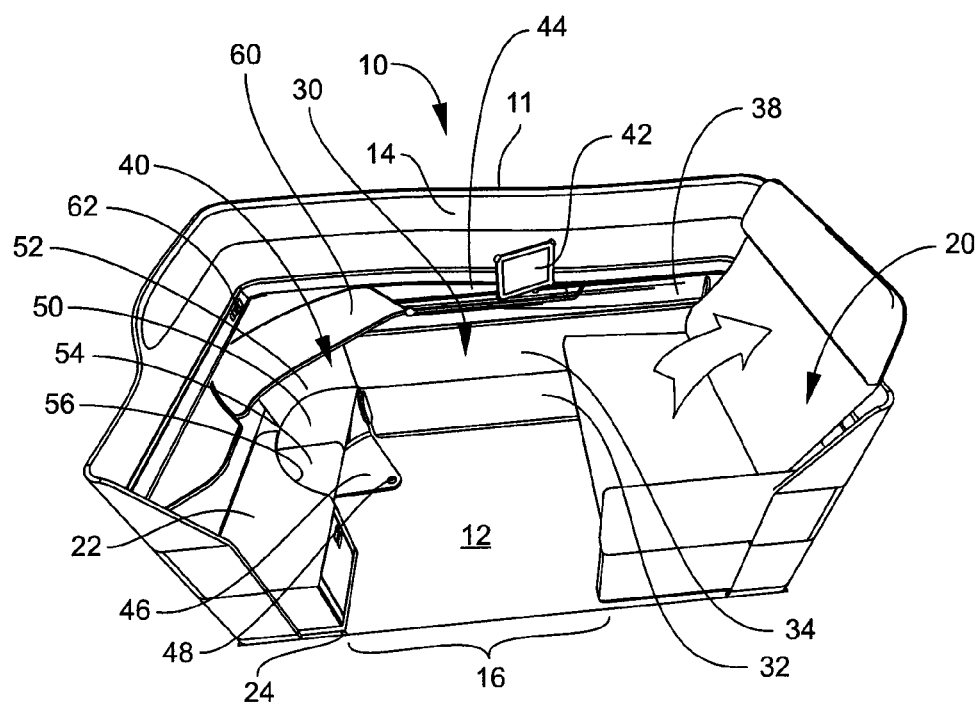
FIG. 2 is a perspective view showing a flexible-usage travel suite with the seat in its upright position, and indicating that the seat bottom lifts up and stows against the seat back.
Figure 3:
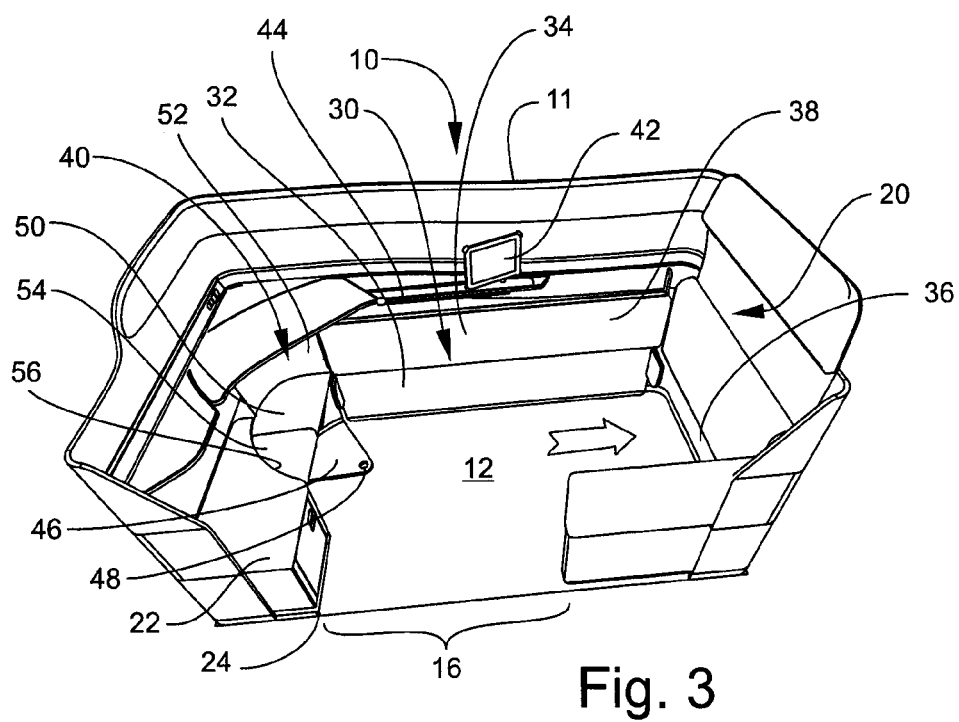
FIG. 3 is a perspective view according to FIG. 2 and showing the seat in the stowed storage position.

The travel suite 10 includes several units that function individually to provide the desired premium class travel experience. A passenger seat 20 is positioned on one end of the enclosure and is moveable between upright, stowed and reclined positions, as shown in FIGS. 2, 3 and 3, respectively. The seat 20 is intended to be used only for sitting, whether upright or reclined. It does not extend into a lie-fact configuration in the manner of known lie-flat premium seating products.

Figure 4:
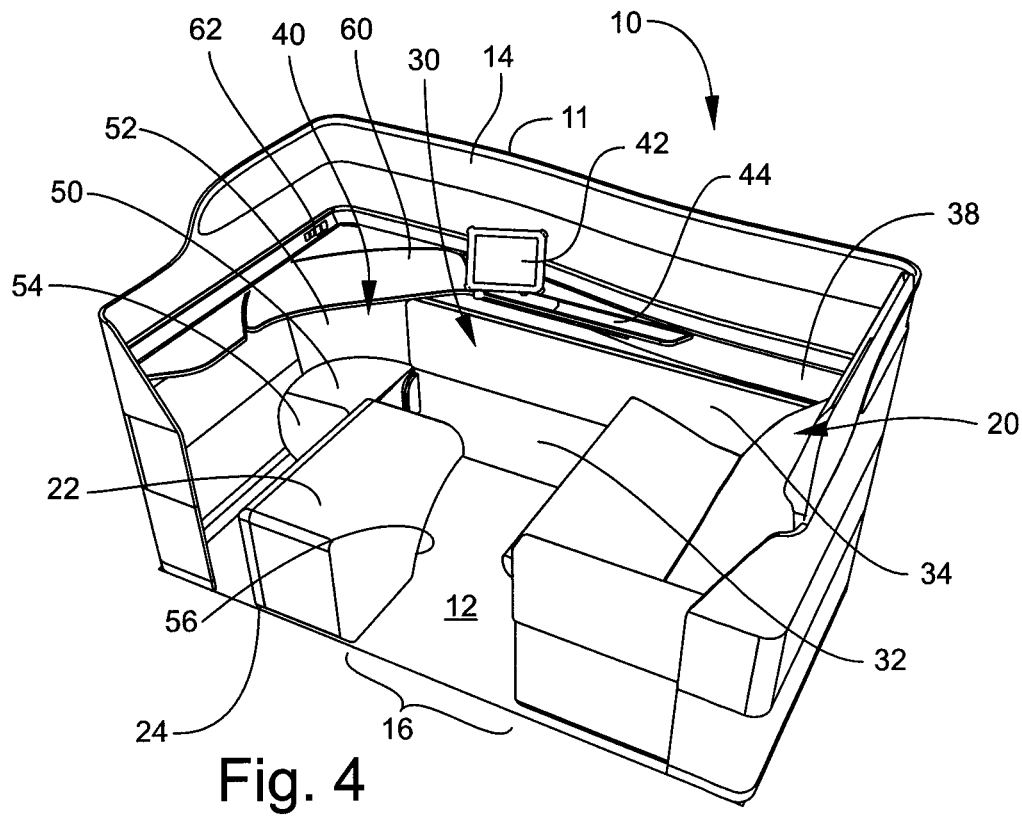
FIG. 4 is a perspective view according to FIG. 2 and showing the seat in the recline position with the seat bottom translated forward.
Figure 5:
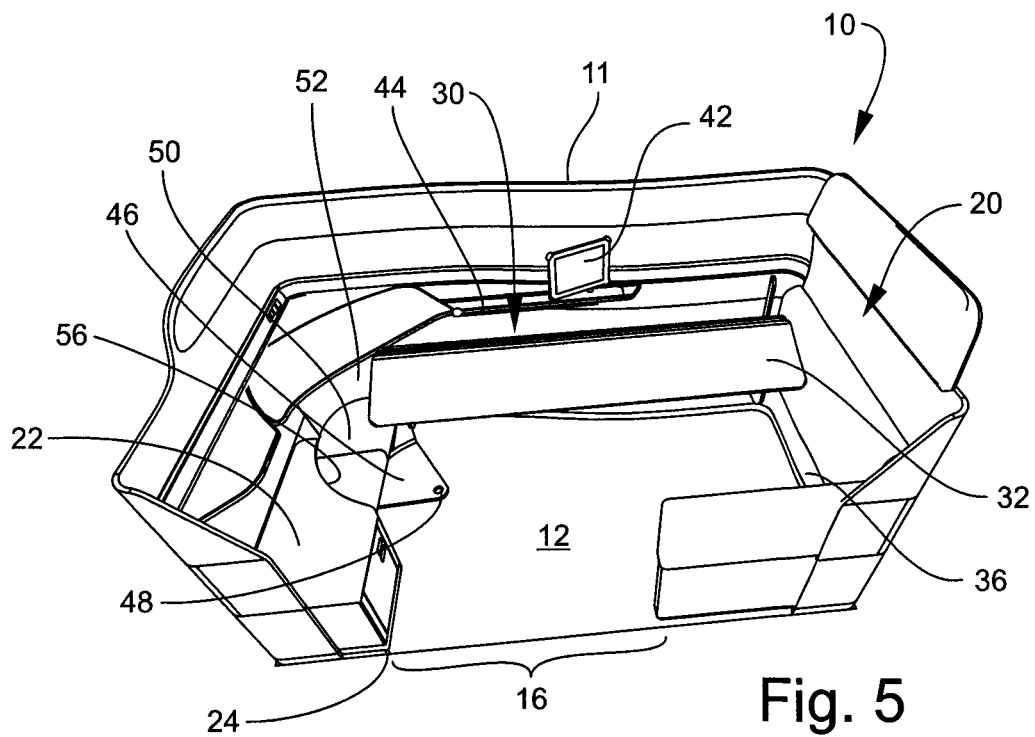
FIGS. 5-8 are perspective views according to FIG. 2 and showing the seat in progressive stages of extending the bed from its stowed position in FIGS. 2-4 into a full length and width lie-flat position.
Figure 6:
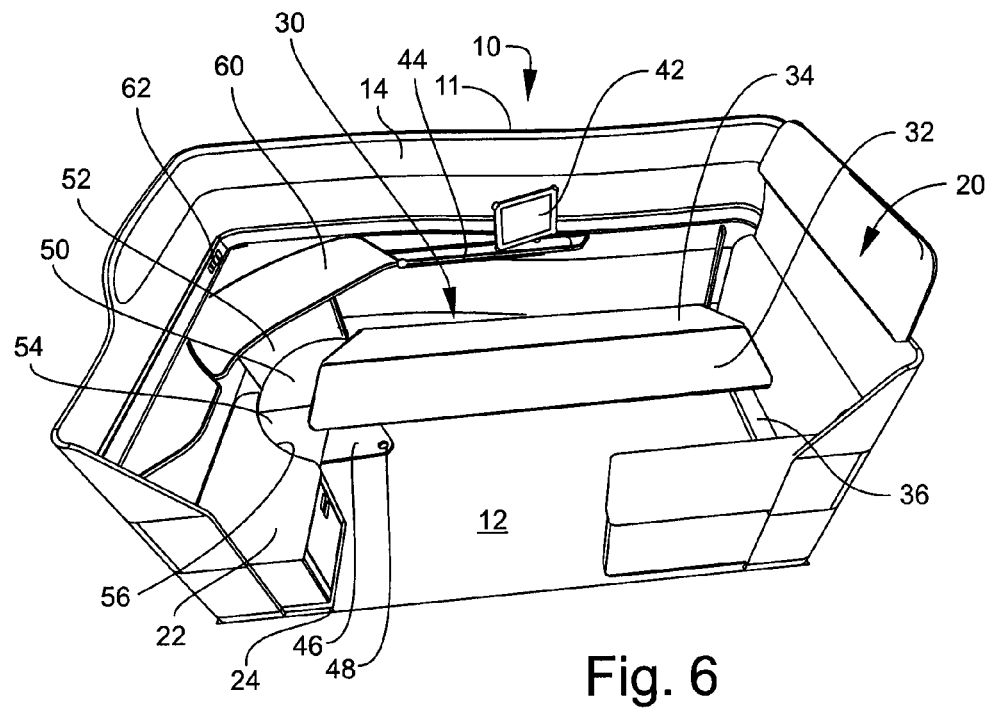
Figure 7:
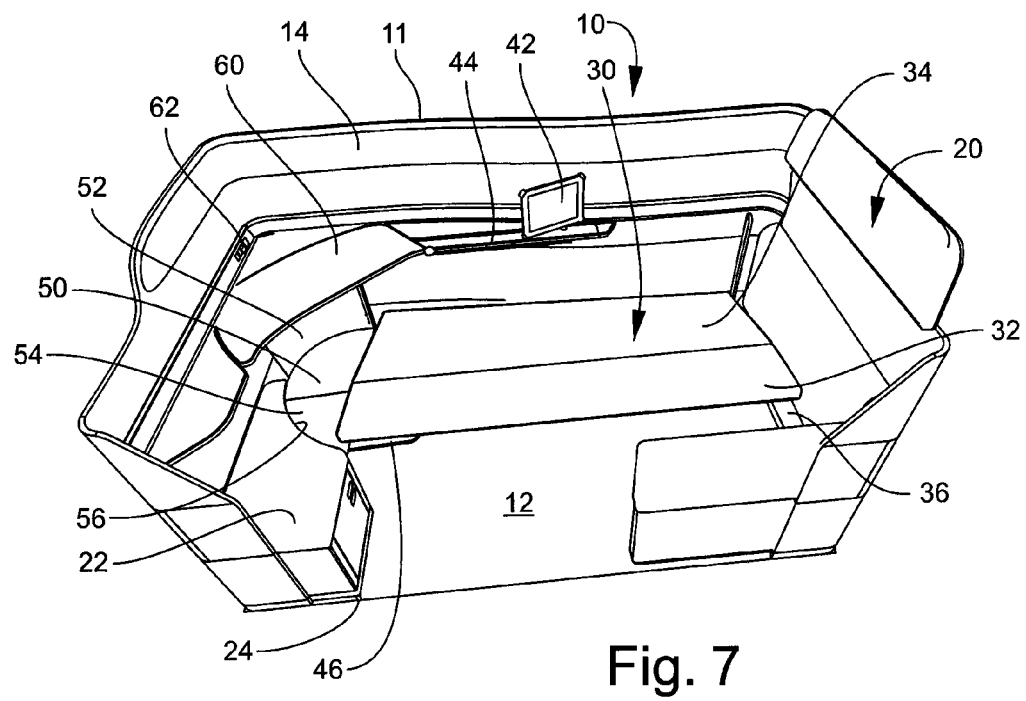
Figure 8:
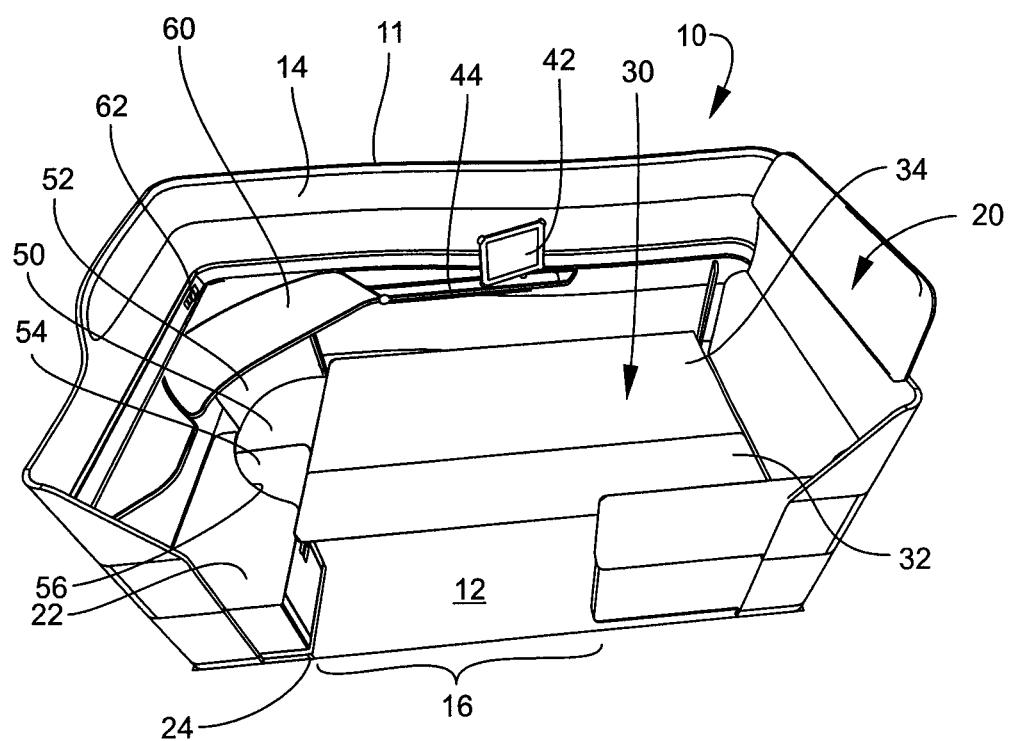
Figure 9:
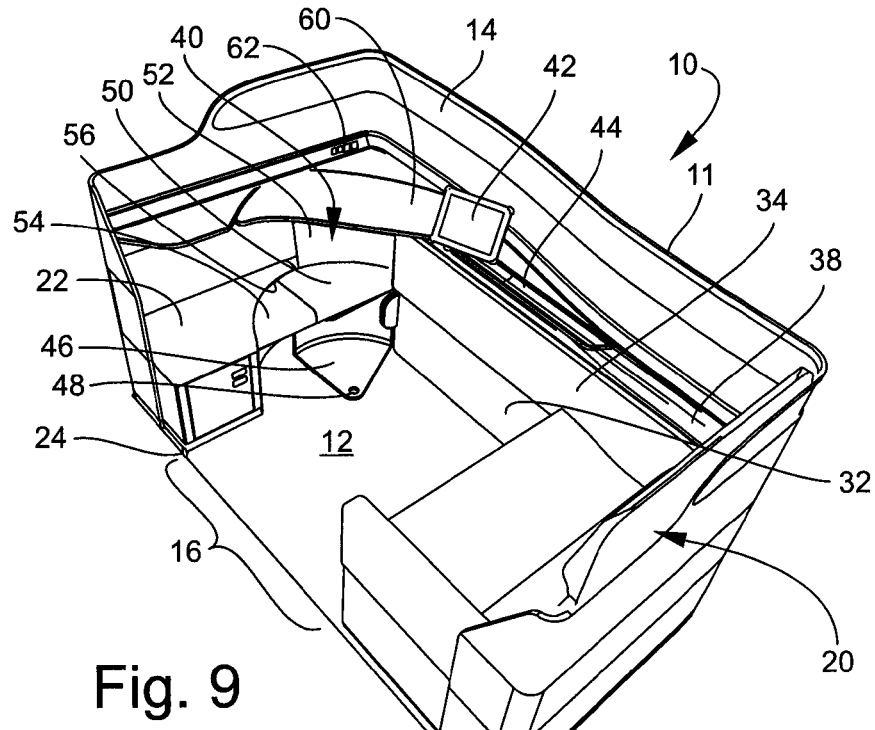
FIGS. 9-11 are perspective views according to FIG. 2 and showing deployment of a utility chair from a stowed position into a deployed position for use.
Figure 10:
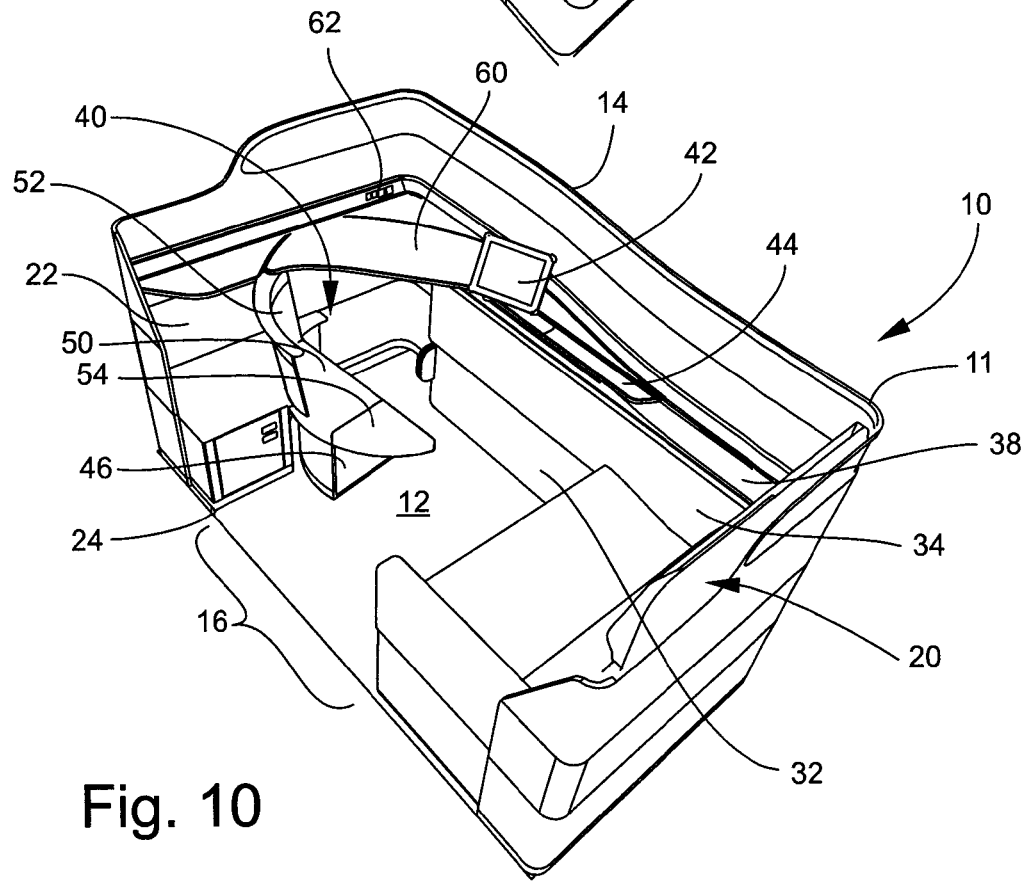

As shown in FIG. 4, an ottoman 22 normally positioned on an opposite end of the enclosure 11 is movable into position so that it can be used as a foot and leg rest for the seat occupant. In a preferred embodiment, note that the ottoman 22 does not slide into its use position, but is rotated about a laterally-extending axis 24 proximate the floor 12. See, also, FIG. 16.

For sleeping, the seat bottom of the seat 20 is folded upwardly into a stowed storage position, FIG. 3, forms a headboard for a bed 30, and is stowed when not in use against a back wall of the enclosure 11. This stowing of the seat bottom of the seat 20 provides a space in an area defined by the seat bottom in its deployed position. As best shown in FIGS. 5-8, the bed 30 is constructed of joined, pivoting cushion panels 32, 34 that fold out towards the egress/ingress opening 16 to form a lie-flat, horizontal bed surface. The bed 30 is supported on the head end adjacent the seat 20 by a laterally-extending rail 36, and on the foot end by a chair 40, that is described in further detail below. When the bed 30 is in its stowed position, a top edge serves as an arm rest 38 for the right hand side of the seat 20. In the fully deployed bed position shown in FIG. 8, the occupant's upper torso is shielded from direct lateral viewing by adjacent passengers. In this deployed position, the bed 30 occupies the space that had been occupied by the seat bottom of the seat 20 when the seat bottom was deployed. The egress/ingress opening 16 is properly located so that if the bed occupant desires to rise, his or her feet can be extended off of the bed 30, swung to the left and lowered onto the surface of the aircraft cabin aisle. A video monitor 42 is positioned on a slide 44 and is both pivotable for positioning in a desired direction, and slidable to position it at a desired viewing distance from the desired position.

Referring now to FIGS. 9-12, the transition between the stowed storage position and deployed use position of the utility chair 40 is illustrated. The chair 40 is shown in its stowed position in FIG. 9, and is mounted for rotating movement on a base 46 mounted on a swivel 48 on the floor 12. The chair 40 includes a seat bottom 50, a seat back 52 and a side tray 54 mounted on a side of the chair 40 and moveable between a raised, horizontal use position, FIGS. 9 and 10, and a lowered, vertical stowed position alongside the base 46 of the chair 40, FIGS. 11 and 12. The space occupied by the chair 40 in both its stowed and deployed positions is optimized by conforming the chair 40 to the curved shape of an adjacent side wall 56 of the ottoman 22.

Figure 11:
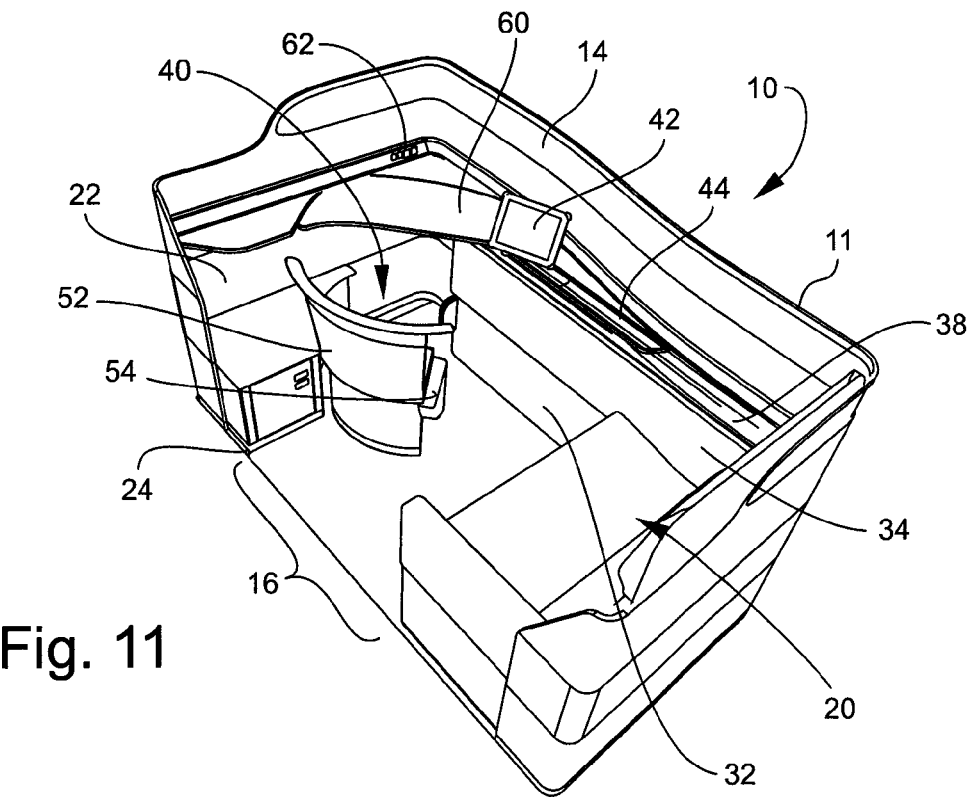
Figure 12:
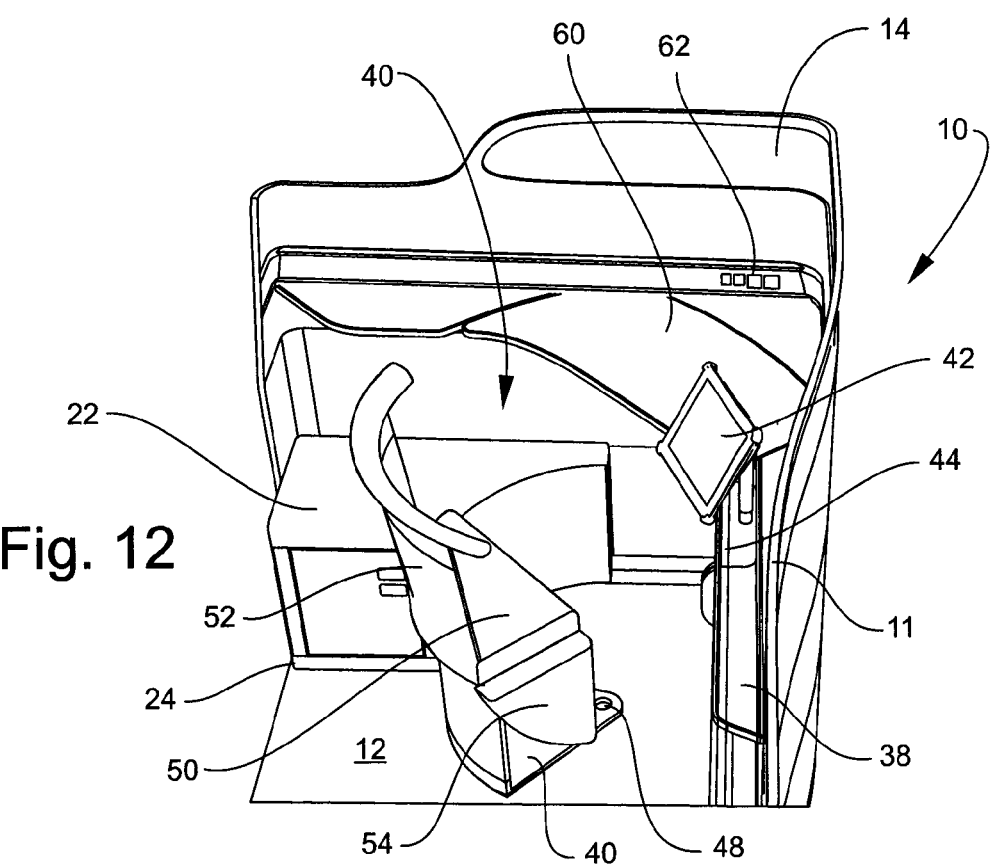
FIG. 12 is a partial end view showing the utility table end of the travel suite.

With the chair 40 in the deployed position, as in FIGS. 11 and 12, the top surface of the ottoman 22 serves a small side table. A utility table 60 is positioned diagonally across a corner of the enclosure 11 and in front of the chair 40 in the deployed position. The wall 14 of the enclosure 11 is provided with a power/communication strip 62 with suitable power outlets for computers, PDA charger units and appropriate communications connection ports. In the deployed position, one user can be seated in the utility chair 40, while another user is seated in the seat 20. This feature is particularly useful in the two seat embodiment, not illustrated, but discussed above.

Figure 13:
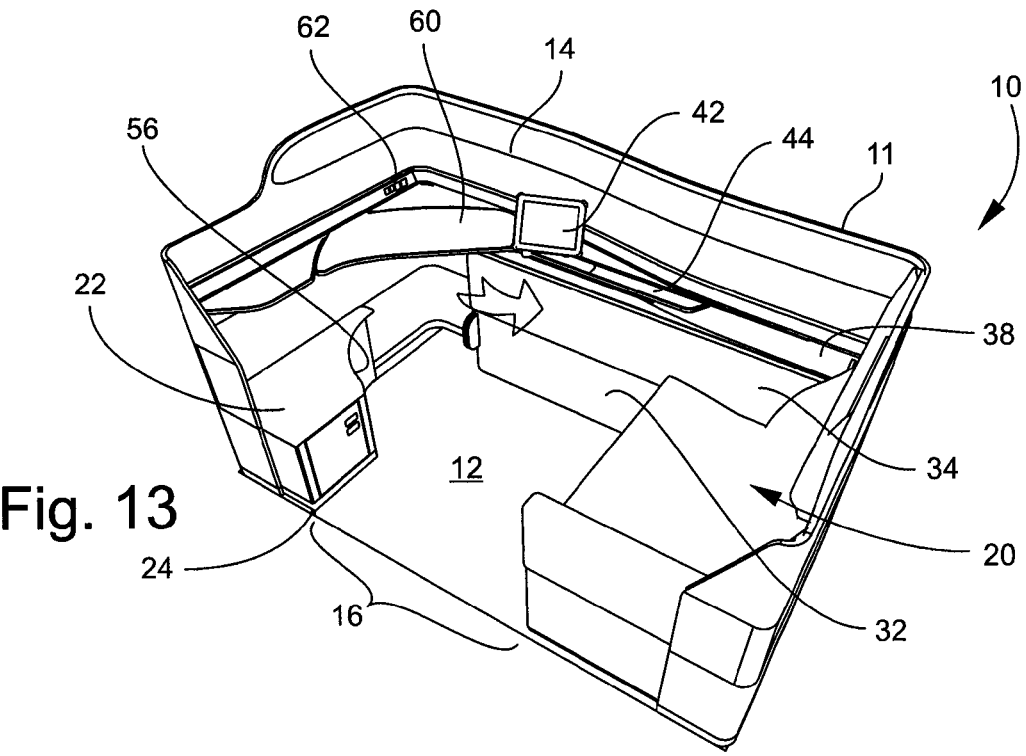
FIGS. 13-15 are perspective views according to FIG. 2 and showing movement of the table into position for use by a user seated in the seat.
Figure 14:
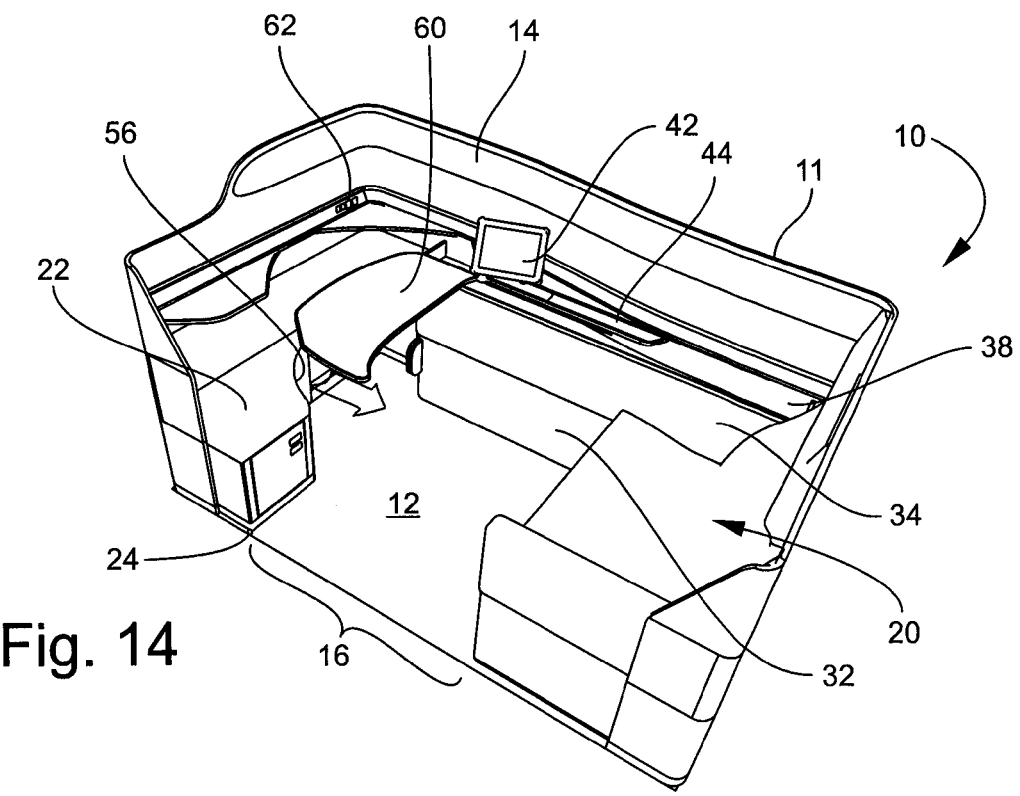
Figure 15:
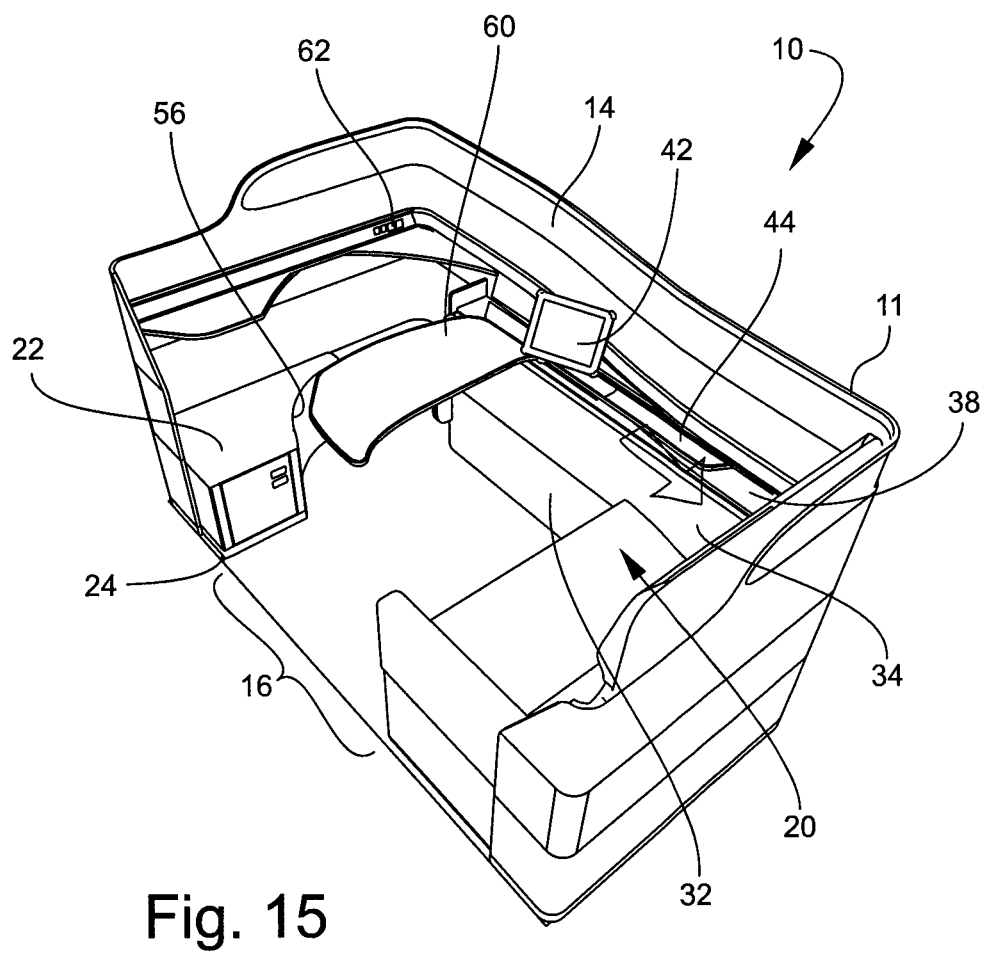

The table 60 is mounted for both pivoting and sliding movement from the chair use position shown in FIGS. 9-12, into a seat use position into which the table 60 is shown moving in FIGS. 13-15. Continued movement of the table 60 towards seat 20 permits the table to serve as a work and dining surface for occupant of seat 20.

Figure 16:
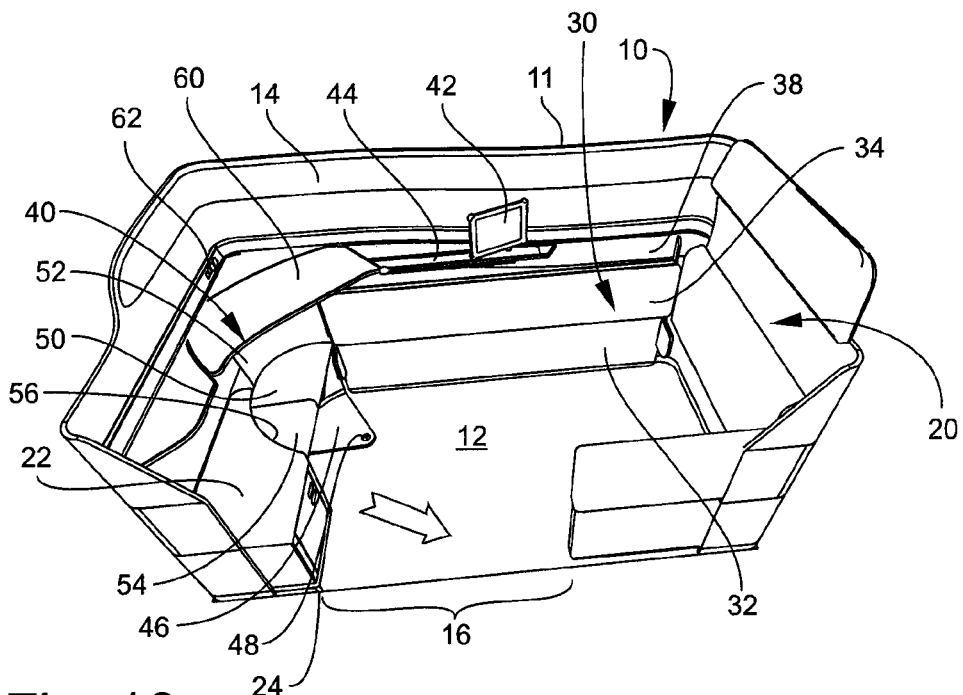
FIGS. 16-17 are perspective views according to FIG. 2 and showing movement of the ottoman into a deployed position for use by a user seated in the seat.
Figure 17:
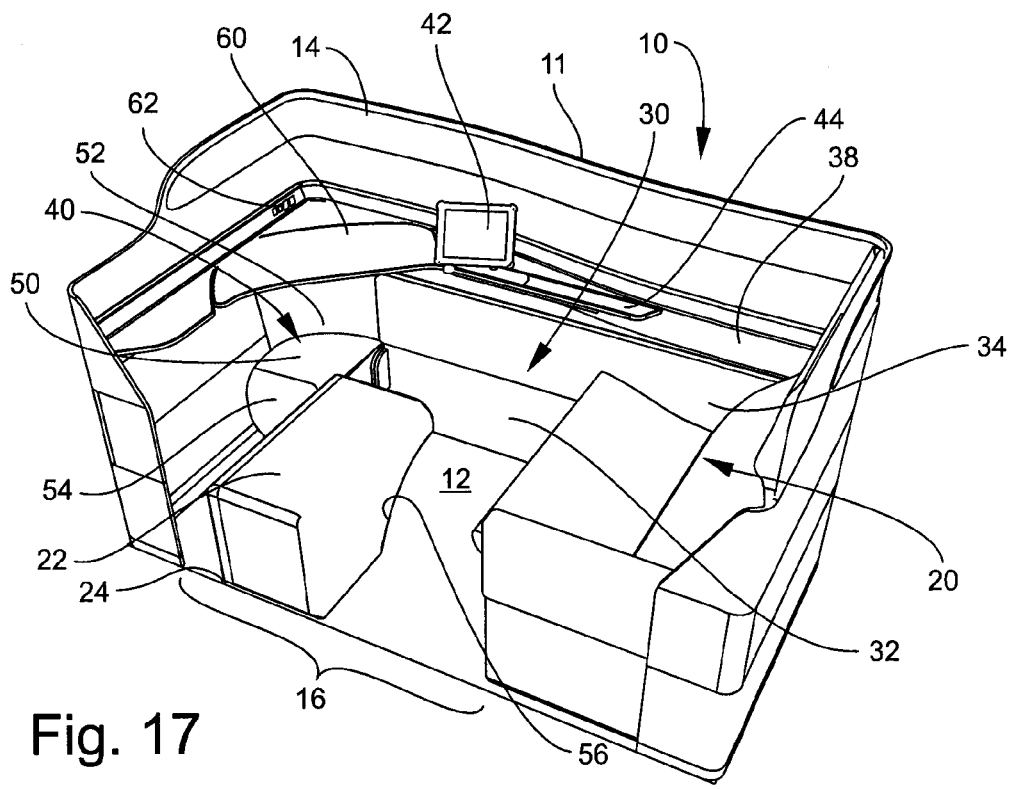

As shown in FIGS. 15-16, the ottoman 22 is stowed for takeoff and landing in the FIG. 15, against a wall 14 of the enclosure 11 and the seat back 52 of the chair 40. To deploy the ottoman 22 into a use position with the seat 20, the ottoman 22 is rotated forwardly towards the seat 20 into the position shown in FIG. 17. This is accomplished by a horizontal, laterally-extending pivot on the floor 12 on which the ottoman is mounted. In this manner, a rear side of the ottoman 22 in its stowed position becomes an upward facing feet and lower legs support, as shown in FIG. 17. Note also in FIG. 16 the significant amount of additional space in the travel suite 10 when both the seat 10 and the bed 30 are in their respective stowed positions.

Figure 18:
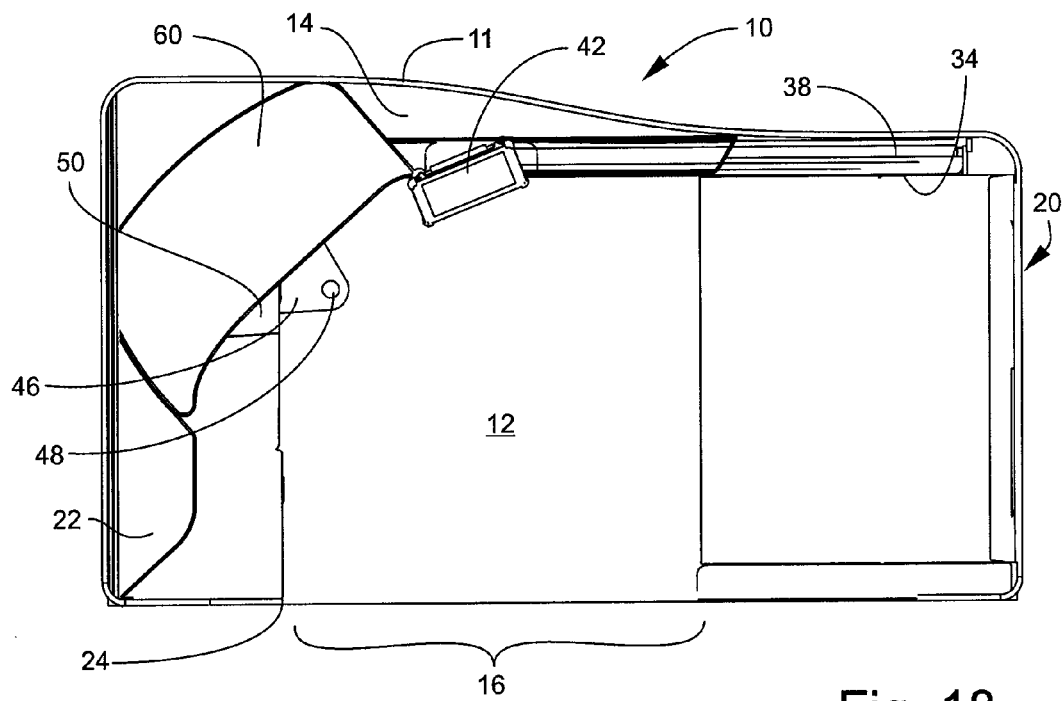
FIG. 18 is a top plan view of the flexible-usage travel suite showing the utility chair in its stowed position.

FIG. 18 is a top plan view of the travel suite 10 with the utility chair 40 in its stowed position.

Figure 19:
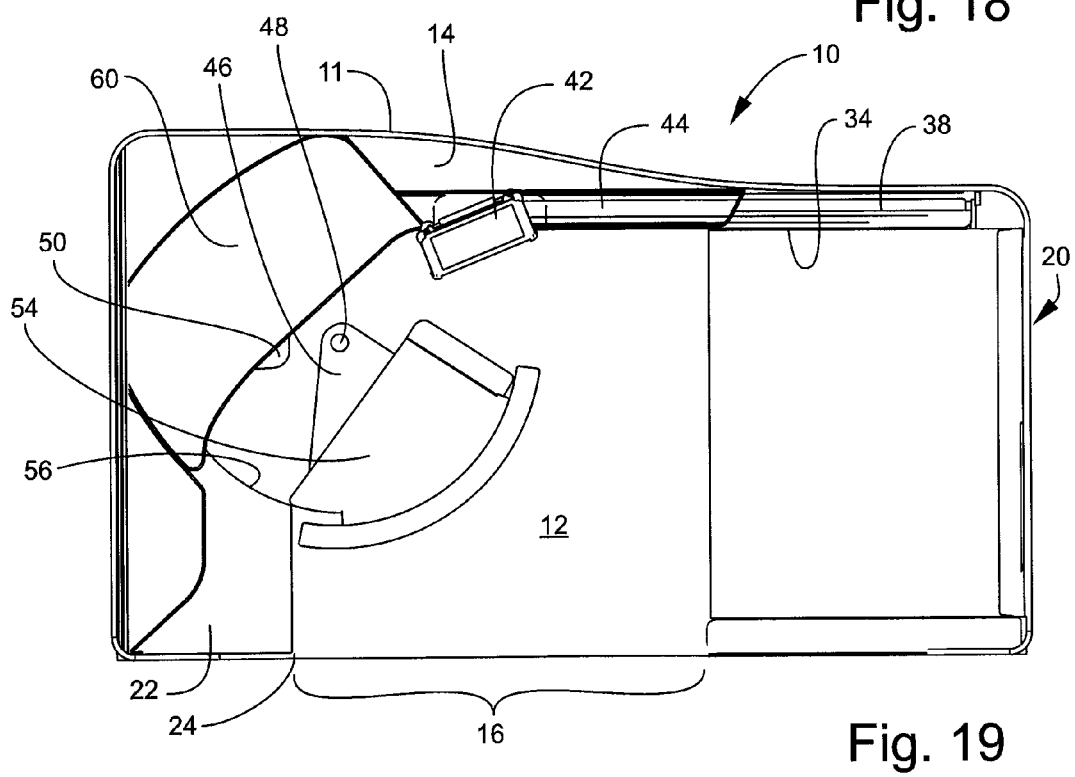
FIG. 19 is a top plan view of the flexible-usage travel suite showing the utility chair in its deployed use position.

FIG. 19 is a top plan view of the travel suite 10 with the utility chair 40 in its deployed position.

The travel suite 10 described and illustrated above therefore has many potential uses where space and weight are critical cost factors, such as in aircraft, ships and other vehicle and non-vehicle berthing areas. While the travel suite 10 may be considered a premium passenger area in the context of aircraft travel, the same or similar travel suite 10 may be considered as a less expensive class of travel and/or accommodation in other contexts.

A flexible-usage travel suite is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A flexible-usage travel suite; comprising:
   (a) an enclosure having a floor, surrounding walls defining a predetermined area and an egress/ingress opening;
   (b) a seat having a seat back and a seat bottom positioned adjacent a first side of the enclosure and moveable between a deployed seating configuration and a stowed storage configuration wherein the seat bottom is folded upwardly against the first side of the enclosure to provide a space in an area defined by the seat bottom in its deployed position;

(c) a bed positioned adjacent a second side of the enclosure and moveable between a deployed lie-flat configuration occupying the space when the seat bottom is in its stowed storage configuration, and a stowed storage position when the seat bottom is in its deployed seating configuration;

(d) a utility chair positioned adjacent a third side of the enclosure opposite the first side of the enclosure and moveable between a deployed use configuration when the bed is in its stowed storage configuration, and a stowed configuration when the bed is in its deployed lie-flat configuration; and (e) a utility table positioned within the enclosure and moveable among a stowed position, a first deployed use position forward of the utility chair, and a second deployed use position forward of the seat.

2. A flexible-usage travel suite according to claim 1, wherein the seat is moveable among a deployed upright seating configuration, a deployed recline seating configuration, and a stowed storage configuration against the first side of the enclosure.

3. A flexible-usage travel suite according to claim 1, wherein a lengthwise dimension of the bed in both its deployed and stowed configurations is generally perpendicular to a widthwise dimension of the seat in both its deployed and stowed configuration.

4. A flexible-usage travel suite according to claim 1, wherein the stowed seat forms a headboard for the bed when the bed is in the deployed position.

5. A flexible-usage travel suite according to claim 1, wherein a proximate portion of the stowed bed forms an armrest for an adjacent side of the deployed seat.

6. A flexible-usage travel suite according to claim 1, wherein the utility chair is pivotally mounted for rotation between the deployed use configuration and the stowed configuration.

7. A flexible-usage travel suite according to claim 1, including an ottoman positioned on the third side of the enclosure and at least a first portion of the ottoman positioned adjacent the utility chair in their respective stowed storage configurations.

8. A flexible-usage travel suite according to claim 1, wherein the utility table is mounted for pivotal movement between the stowed stowage position and the first use position forward of the utility chair, and further wherein the utility table is mounted for sliding movement between the first use position forward of the utility chair and the second use position forward of the seat.

9. A flexible-usage travel suite according to claim 1, and including an ottoman positioned on the third side of the enclosure and at least a second portion of the ottoman mounted for being rotated on a horizontal, laterally-extending axis towards the deployed seat into a use position.

10. A flexible-usage travel suite according to claim 1, wherein the utility chair includes a side tray mounted on a first side of the chair and moveable between a raised, horizontal use position and a lowered, vertical stowed position alongside a base of the utility chair.

11. A flexible-usage travel suite; comprising:
(a) an enclosure having a floor, surrounding walls defining a predetermined area and an egress/ingress opening;
(b) a seat having a seat back and a seat bottom positioned adjacent a first side of the enclosure and moveable among a deployed upright seating configuration, a deployed recline seating configuration, and a stowed storage configuration wherein the seat bottom is folded upwardly against the first side of the enclosure to provide a space in an area defined by the seat bottom in its deployed position;
(c) a bed positioned adjacent a second side of the enclosure and moveable between a deployed lie-flat configuration occupying the space when the seat bottom is in its stowed storage configuration, and a stowed storage position when the seat bottom is in its deployed seating configuration, wherein a lengthwise dimension of the bed in both its deployed and stowed configuration is generally perpendicular to a widthwise dimension of the seat in both its deployed and stowed configuration and the stowed seat forms a headboard for the bed in the bed's deployed position and a portion of the stowed bed forms an armrest for an adjacent side of the deployed seat;
(d) a utility chair positioned adjacent a third side of the enclosure opposite the first side of the enclosure and moveable between a deployed use configuration when the bed is in its stowed storage configuration, and a stowed configuration when the bed is in its deployed lie-flat configuration; and
(e) a utility table positioned within the enclosure and pivotally-mounted among a stowed position, a first deployed use position forward of the utility chair, and a second deployed use position forward of the seat.

12. A flexible-usage travel suite according to claim 11, including an ottoman positioned on the third side of the enclosure and at least a first portion of the ottoman comprising the utility chair in its stowed storage configuration.

13. A flexible-usage travel suite according to claim 11, wherein the utility table is mounted for pivotal movement between the stowed storage position and the first use position forward of the utility chair, and further wherein the utility table is mounted for sliding movement between the first use position forward of the utility chair and the second use position forward of the seat.

14. A flexible-usage travel suite according to claim 11, including an ottoman positioned on the third side of the enclosure and at least a second portion of the ottoman mounted for being rotated on a horizontal, laterally-extending axis towards the deployed seat into a use position.

15. A flexible-usage travel suite according to claim 11, wherein the utility chair includes a side tray mounted on a first side of the chair and moveable between a raised, horizontal use position and a lowered, vertical stowed position alongside a base of the utility chair.

16. An aircraft cabin living area comprising a plurality of flexible-usage travel suites positioned in the aircraft cabin in a predetermined array, each of the travel suites including:
(a) an enclosure having surrounding walls and a floor defining a predetermined area and an egress/ingress opening;
(b) a seat having a seat back and a seat bottom positioned adjacent a first side of the enclosure and moveable between a deployed seating configuration and a stowed storage configuration wherein the seat bottom is folded upwardly against the first side of the enclosure to provide a space in an area defined by the seat bottom in its deployed position;
(c) a bed positioned adjacent a second side of the enclosure and moveable between a deployed lie-flat configuration occupying the space when the seat bottom is in its stowed storage configuration, and a stowed storage position when the seat bottom is in its deployed seating configuration;

(d) a utility chair positioned adjacent a third side of the enclosure opposite the first side of the enclosure and moveable between a deployed use configuration when the bed is in its stowed storage configuration and a stowed configuration when the bed is in its deployed lie-flat configuration; and (e) a utility table positioned within the enclosure and moveable among a stowed position, a first use position forward of the utility chair, and a second deployed use position forward of the seat.

17. A flexible-usage travel suite according to claim 16, wherein the seat is moveable among a deployed upright seating configuration, a deployed recline seating configuration, and a stowed storage configuration against the first side of the enclosure.

18. A flexible-usage travel suite according to claim 16, wherein a lengthwise dimension of the bed in both its deployed and stowed configurations is generally perpendicular to a widthwise dimension of the seat in both its deployed and stowed configuration.

19. An aircraft cabin environment according to claim 18, wherein the environment comprises a long-haul, premium class passenger unit.

20. An aircraft cabin environment according to claim 18, wherein the environment comprises an aircraft crew rest compartment.

* * * * *